April 2, 1946.   W. E. O'SHEI   2,397,621
FLUID PRESSURE MOTOR
Filed April 8, 1943

INVENTOR
WILLIAM E. O'SHEI
BY
Beau, Brooks, Buckley & Beau.
ATTORNEYS

Patented Apr. 2, 1946

2,397,621

UNITED STATES PATENT OFFICE 2,397,621

FLUID PRESSURE MOTOR

William Edward O'Shei, London, England

Application April 8, 1943, Serial No. 482,232
In Great Britain April 15, 1942

5 Claims. (Cl. 309—22)

The present invention relates to fluid pressure motors which are particularly suitable for operating windscreen wipers. The invention relates more particularly to motors in which a piston in the form of a vane or paddle is oscillated in an arcuate chamber, such motors being commonly constructed for operation by suction.

In such motors the paddle customarily comprises a pair of cupped leathers or packings which are assembled closely together and facing each other with the shaft which carries the paddle passing through the paddle between the leathers, the shaft extending beyond either side of the paddle and through the opposite sides of the motor casing. A defect of this construction is that, due to the fact that the leathers must be kept as close together as possible to obtain the maximum arc of oscillation of the paddle, the leathers are bulged outwards opposite the shaft, which causes them to be wrinkled and results in difficulty in assembling the paddle in the motor casing and also in the possibility of leakage.

The present invention contemplates an improved construction of motor whereby objectionable wrinkling of the paddle leathers may be mitigated or avoided; assembly of the motor may be simplified; and leakage at the leathers during operation of the motor may be decreased. The invention further contemplates a novel assembly of paddle and shaft which overcomes defects of former constructions.

Illustratively, the invention will now be further explained with reference to a specific embodiment thereof represented in the accompanying drawing, but it is to be understood that this disclosure is by way of example only and that the invention is not to be considered as limited otherwise than as defined in the appended claims.

Figure 2:
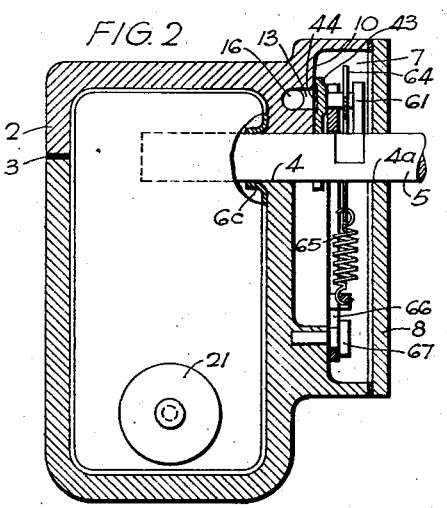
Fig. 2 is a section through the motor taken approximately on the line 2—2 of Fig. 1.

The motor illustrated in the drawing has a casing comprising a body section 1 fitted with a cover section 2 sealed thereto by a gasket 3, forming a sealed arcuate piston chamber in which a vane or paddle type of piston secured to a shaft 5 is adapted to oscillate in an arcuate manner about the axis of the shaft, angularly oscillating the latter. The piston comprises two interconnected paddle cup leathers or packings 6a and 6b which are assembled closely together and facing each other with the shaft 5 between them, their side or flange portions which are directed towards the shaft bearing against the inner wall of the piston chamber so that the paddle divides the chamber into two compartments.

At one side of the casing is a valve chamber 7 which is closed by a cover 8.

In accordance with one feature of this invention, the shaft 5 is supported at one side only of the motor casing, and in the embodiment shown the shaft is supported by a bearing 4 constituted by half bearing surfaces on the casing parts 1 and 2 at the side of the casing between the piston chamber and the valve chamber, and by a second bearing 4a provided in the cover 8. The shaft 5 extends through the cover 8 for attachment of a wiper arm or other driven member to the projecting end of the shaft. In the opposite direction, in which the shaft 5 extends into the paddle between the leathers 6a, 6b, the shaft does not extend across the full width of the paddle, but terminates within the paddle as is clearly seen in Fig. 2, thus enabling the leathers to fit closely together at the side of the paddle remote from the shaft bearings without wrinkling at that place, since at that place there is no part of the shaft 5 between the leathers which would cause them to bulge and wrinkle. By thus terminating the shaft 5 within the paddle, the possibility of wrinkling of the leathers at the side of the paddle remote from the bearings is avoided.

Figure 4:
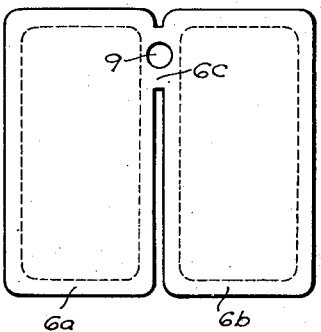
Fig. 4 is a developed view of the paddle leathers.
Figure 3:
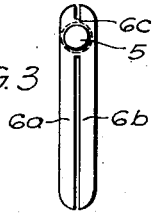
Fig. 3 shows a side view of the motor paddle.

In order to deal with wrinkling of the leathers at the side of the paddle adjacent the shaft bearings, that is to say, where the shaft 5 enters the paddle, a further feature of the invention consists in joining the paddle leathers together at this place by a bridge piece 6c which is provided with an aperture 9 through which the shaft 5 passes. The bridge piece 6c may be produced integrally with the two paddle leathers 6a, 6b by making them from a one-piece blank as illustrated in Fig. 4. As seen more clearly in Fig. 2, the periphery of the aperture 9 in the bridge piece 6c is flanged inwardly for providing a sealing lip to lie snugly against the surface of the shaft 5. By joining the two paddle leathers together in this way, it is found that wrinkling of the leathers where the shaft enters between them is overcome. Thus, by the described construction the difficulties which have hitherto been experienced of wrinkling of the paddle leathers may be avoided, with consequent simplification in assembling the paddle in the motor casing and reduction of leakage at the paddle leathers during operation of the motor.

Figure 5:
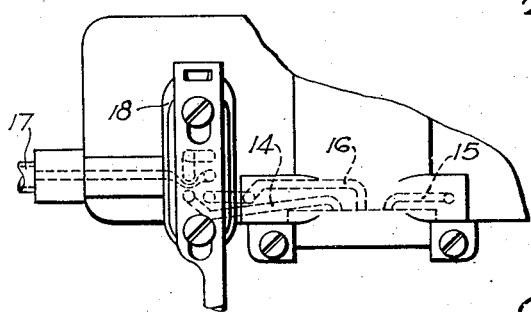
Fig. 5 is a fragmentary plan view showing details of the control means for the motor.

On a part of the cover 2 of the casing which is within the valve chamber 7 is a valve seat 10 into which open three valve ports 11, 12 and 13. Port 11 leads into a passage 14 for communication, in a manner later mentioned, with the piston chamber at the left hand side of the paddle (as viewed in Fig. 1). Port 12 communicates through passage 15 directly with the piston chamber at the other (right-hand) side of the paddle. Port 13 leads into a passage 16 which is adapted to be put into communication with the suction supply conduit 17 through a manual control valve 18 when the latter is in the "on" position shown in Fig. 5. With the control valve 18 in this position, the passage 14 can communicate with the left hand compartment of the piston chamber through ports in the control valve and a passage 19 which opens at its lower end into a cup 20 in the piston chamber. The cup 20 is adapted to be closed by a closure 21 on the paddle when the latter is moved into its parked position by the control valve 18 being moved to its "off" (or "parking") position which causes the supply of suction to be cut off from the passage 16 and applied directly through the passage 19 to the left hand compartment of the piston chamber.

Figure 1:
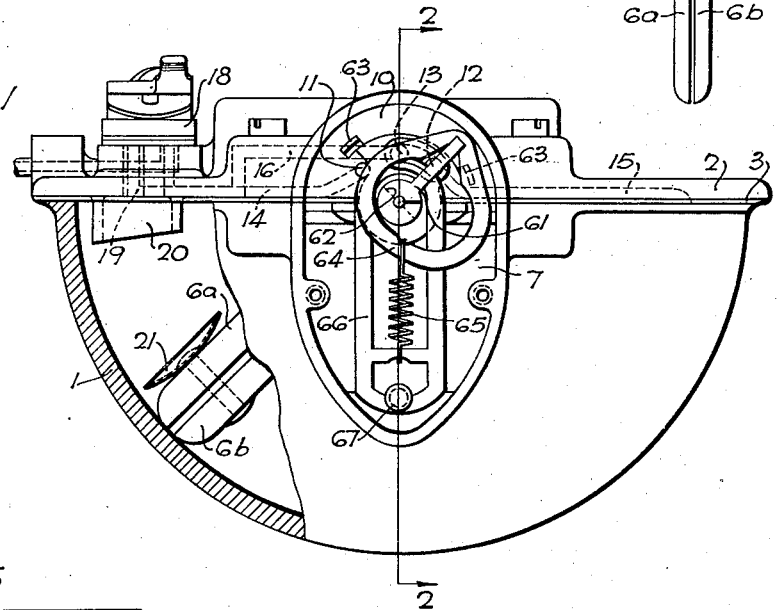
Fig. 1 is a side view, partly in section and with the cover of the valve chamber removed, of a suction-operated motor embodying the invention.

Mounted for movement upon and about the axis of the portion of the shaft 5 within the valve chamber 7 is an oscillatory valve member 43 which is actuated by a snap-action mechanism operated by the movement of the shaft 5 to move the valve 43 to the position shown in Fig. 1 when the piston approaches its operating limit position of clockwise movement (as seen in the figure) and to move the valve to the opposite position when the piston approaches its limit of counter-clockwise movement. The valve 43 has a face in sliding contact with the valve seat 10 and has upon its valve face a channel 44 which, in the position shown in Fig. 1, opens communication between the ports 12 and 13 and in the alternative position effects communication between the ports 11 and 13, in each case by way of the channel 44. Atmospheric air enters the motor through the valve chamber 7 and by the one or the other of the ports 11, 12 which is not for the time being covered by the valve 43.

The snap-action mechanism for operating the valve 43 comprises a kicker 61 which is pivoted to the shaft 5 at the axis of the latter and is engageable by faces 62 of a recess in the shaft. The kicker is engageable with ears 63 on the valve 43 to shift the latter between its two operative positions and the outer end of the kicker is engaged by a frame 64 which is anchored by a spring 65 to a pressure plate 66 which is mounted over the shaft 5 and a post 67 extending from the adjacent face of the casing 1, the pressure plate bearing against the outer face of the valve 43. It will be seen that when the shaft 5 turns angularly counter-clockwise as viewed in Fig. 1, the right shoulder 62 will engage and move kicker 61 until the outer end thereof passes beyond a line extending through the centre of post 67 and the centre of shaft 5, whereupon the spring 65 will snap the kicker counter-clockwise against the left ear 63 of valve 43 and thus move the latter to its left limit position. Movement of the shaft in the opposite direction, clockwise, will cause the parts to operate in the reverse manner snapping the valve to the position shown in Fig. 1.

Although a specific embodiment of the invention has been described in its application to a suction-operated motor, to which class of motor the invention is especially applicable, the invention may also be applied to motors operated with compressed air, in which case the aperture in the valve chamber cover through which the paddle shaft passes would be provided with a gland or other sealing means for preventing leakage therepast, and the valve chamber would be closed in an airtight manner and provided with an inlet for supply of compressed air thereto.

I claim:

1. In a fluid-operated motor having an arcuate chamber, a piston therein comprising an oscillatory radial vane mounted on a rocker shaft and having a pair of mutually adjacent cupped packings facing each other with the shaft therebetween, said shaft extending between said packings into said piston a distance less than the width of said packings whereby to terminate at one end thereof within the piston, said shaft extending in the opposite direction through and beyond a side of said casing, bearing means supporting said shaft at said side, said packings having a bridge piece joining them together at the side of the piston adjacent said bearing means, the cupped packings at the opposite side of the piston lying in uninterrupted fluid sealing contact with the casing, said bridge piece having an aperture therein through which said shaft passes with a fluid sealing contact.

2. A fluid-operated motor as defined in claim 1, in which said bridge piece has a flange around the periphery of the said aperture therein which is in encircling engagement with the surface of the shaft passing therethrough.

3. A piston comprising an oscillatory radial vane mounted on a rocker shaft and having a pair of mutually adjacent cupped packings facing each other with the shaft therebetween, the flanges of the packings being spaced apart a distance less than the diameter of the shaft, said shaft extending between said packings into said piston at one side thereof a distance less than the width of said packings whereby to terminate at one end thereof within the piston and thereby provide uniform fluid sealing contact of the packing flanges at the remote side of the piston with a chamber wall, said packings having a bridge piece joining them together at the side of the piston adjacent said bearing in said side of the casing, said bridge piece having an aperture therein through which said shaft passes.

4. A fluid-operated motor as defined in claim 3, in which said bridge piece has a flange around the periphery of the said aperture therein which is in fluid sealing engagement with the surface of the shaft passing therethrough.

5. A piston comprising an oscillatory radial vane mounted on a rocker shaft and having a pair of mutually adjacent cupped packings with marginal flanges extending toward each other, the shaft being interposed between the cupped packings, said packings having a bridge piece joining them together at one side and having an aperture therein through which the shaft snugly passes, said bridge piece being an integral continuation of the adjacent marginal flange portions and having an annular lip encircling the shaft in fluid sealing contact therewith.

WILLIAM EDWARD O'SHEI.